(12) United States Patent
Morse et al.

(10) Patent No.: US 6,227,045 B1
(45) Date of Patent: May 8, 2001

(54) GROUNDWATER FLOW MEASURING SYSTEM

(75) Inventors: James S. Morse, Bradford, VT (US); Christopher R. Williams, Grafton, NH (US); Daniel E. Lawson, Palmer, AK (US); Donald E. Garfield, Meriden; Thomas J. Tantillo, Canaan, both of NH (US)

(73) Assignee: US Army Corps of Engineers as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/397,071

(22) Filed: Sep. 16, 1999

(51) Int. Cl.[7] .............................. G01F 1/68; E21B 47/06; E21B 47/00; G01K 13/00
(52) U.S. Cl. .................................. 73/204.22; 73/204.25; 73/152.12; 166/264; 374/136
(58) Field of Search ........................... 73/37, 40, 40.5 R, 73/49.2, 861, 204.11, 204.22, 204.23, 204.25, 152.12, 152.02, 152.01; 166/244.1, 264; 374/100, 136

(56) References Cited

U.S. PATENT DOCUMENTS

| 3,352,154 | 11/1967 | Djorup . |
| 3,498,127 | 3/1970 | Richards . |
| 4,391,137 | 7/1983 | Kerfoot et al. . |
| 4,547,080 | 10/1985 | Dunn et al. . |
| 4,628,743 | 12/1986 | Miller et al. . |
| 4,916,948 | 4/1990 | Inada et al. . |
| 5,226,333 | * 7/1993 | Hess ...................................... 73/155 |
| 5,339,694 | 8/1994 | Looney et al. . |
| 5,412,983 | 5/1995 | Rombach et al. . |
| 6,062,073 | * 5/2000 | Patton et al. ....................... 73/152.38 |

* cited by examiner

Primary Examiner—Richard A. Moller
(74) Attorney, Agent, or Firm—John MacEvoy

(57) ABSTRACT

A probe for monitoring groundwater flow seepage velocity and direction has an electrical heater and a plurality of temperature sensors located equidistant from the heater. The probe with the heater and temperature sensors is lowered into a monitoring well and positioned so as to be immersed in the groundwater. Energy is sent to the heater, and the temperature response at the temperature sensors is measured and recorded. From the measured response to temperature, the groundwater flow velocity and direction are computed and recorded. The temperature sensors may be resistance temperature detectors, thermocouples, or any other state-of-the-art temperature sensing device.

6 Claims, 3 Drawing Sheets

GROUNDWATER FLOW MEASURING SYSTEM

GOVERNMENT INTEREST STATEMENT

Figure 1:
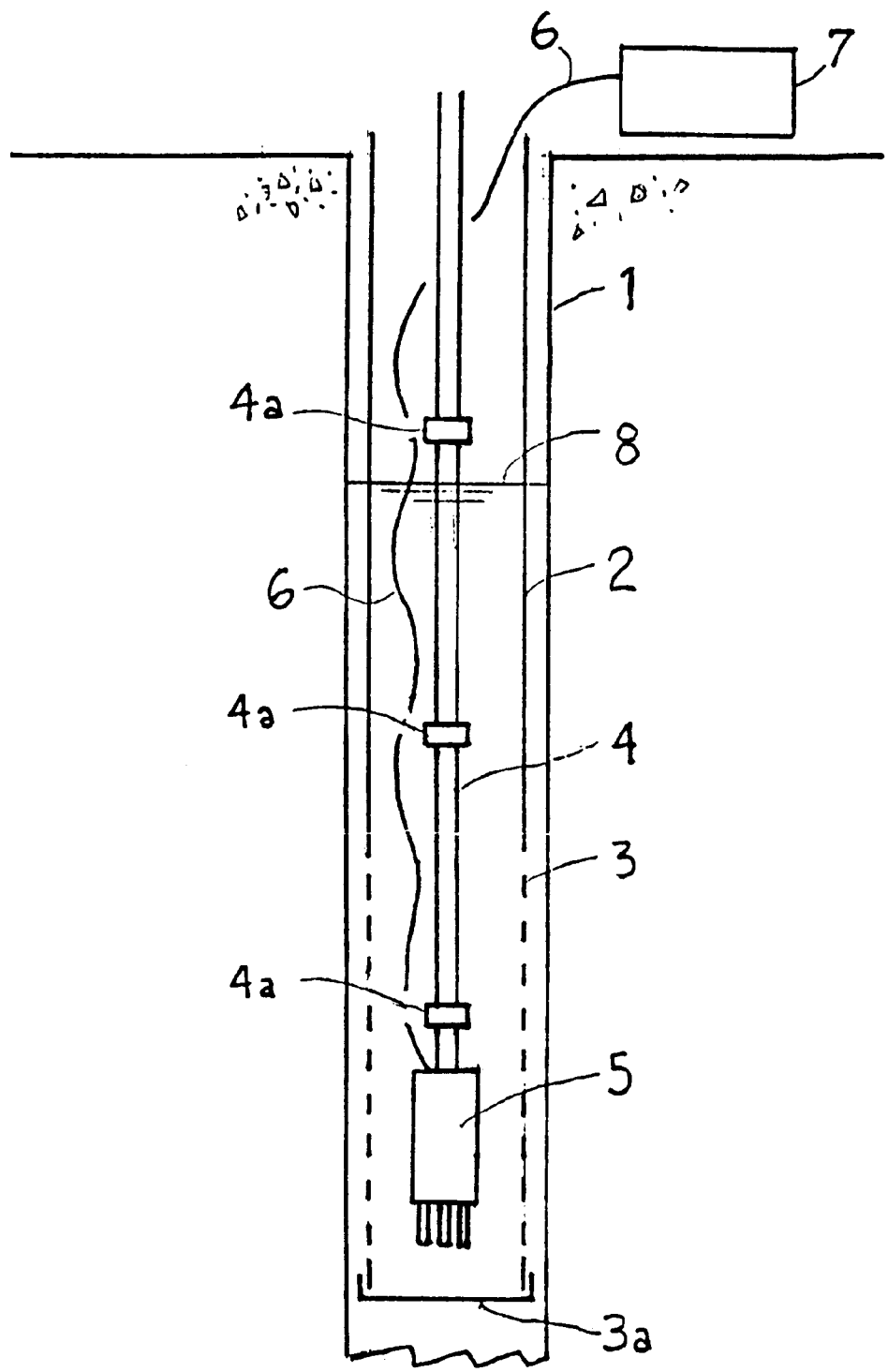

The invention described herein may be manufactured, licensed, and used by or for governmental purposes without the payment of any royalties thereon.

I. BACKGROUND OF THE INVENTION

1. Field of Invention

This invention relates to improved apparatus and a method of measuring groundwater flow. More specifically, it relates to apparatus and a method of measuring groundwater flow at very low seepage velocities and direction by the introduction of heat into the groundwater and sensing the distribution of the heat with temperature sensors.

2. Prior Art

There are many methods and devices for measuring fluid flow in the prior art. For example, U.S. Pat. No. 3,498,127 discloses a method wherein an energy source, such as a heater, is immersed in a moving fluid and wherein changes in fluid properties, such as temperature, are used to detect and measure flow velocity and direction. U.S. Pat. No. 4,628,743 discloses a device wherein a heat pulse is injected into the flowing stream by a miniature thermistor and the detection of an electronic time derivative of temperature downstream triggers subsequent heat pulses, the pulse frequency being related to flow rate. U.S. Pat. No. 4,916,948 discloses the use of thermal flow sensors, such as thermosensitive resistors, for air flow measurement. U.S. Pat. No. 5,412,983 discloses the measurement of fluid velocity with a single temperature-dependent resistor in a partially-open measurement chamber. All the fluid flow measurement methods and devices are for relative high fluid velocities, much higher than would be encountered in underground water flow. The prior-art methods and devices for measuring fluid velocity are, therefore, unsuitable for underground water monitoring.

U.S. Pat. No. 5,339,694 discloses a monitoring probe for detecting groundwater migration based on electrical conductivity. Salt water is filled into a cylinder having a permeable membrane and a plurality of electrical conductivity sensors on its outer surface. As the salt water diffuses into the groundwater, electrical conductivity around the cylinder is monitored by the sensors and analyzed to determine groundwater flow velocity and direction. U.S. Pat. No. 3,352,154 relates to an apparatus for measuring the motion of gases, specifically air, consisting of a refractory cylinder upon whose surface an electrically conductive ring and a pair of electrically conductive metal strips are affixed. These are made of a metal having a high temperature coefficient of electrical resistance. They are electrically heated and their resistance is used to determine temperature and air flow rate. U.S. Pat. No. 4,547,080 discloses a convective heat flow probe having a plurality of heater pads each with an electric heater and a temperature sensor, for determining heat and fluid flow in the formation surrounding a borehole.

One system of groundwater flow monitoring that has been used in the past comprises digging or drilling vertical wells into the ground water aquifer. The wells typically have an inside diameter from 2 to 6 inches. Smooth-walled plastic casings and screens free of internal obstructions are installed. A heater/temperature probe assembly is then installed such that it is immersed in the groundwater at the depth of interest in the screened section, with wiring connecting the probe assembly with measurement equipment at the surface. A serious drawback of this conventional system, as disclosed in U.S. Pat. No. 4,391,137, is the use of thermistors for temperature measurement. Owing to the extreme nonlinearity of the relationship between temperature and thermistor response, the system has to be corrected for each water temperature, and the probe must be rotated 180° to eliminate sensor bias. As a result, groundwater flow measurements are enormously time consuming with this apparatus.

There is a need, therefore, for improved apparatus and an improved method of measuring and monitoring groundwater flow at extremely low seepage velocities (0.1–10 ft/day). The object of this invention is to provide a system for determining groundwater flow velocity and direction which is more convenient, easier to calibrate, and more accurate than the systems of the prior art.

II. SUMMARY OF THE INVENTION

It has now been found that the drawbacks of the apparatus and methods for measuring groundwater seepage flow and direction of the prior art can be overcome by an improved choice of system components and by other features as disclosed herein. The principal improvement provided by this invention is the use of temperature sensors with a linear temperature response, as opposed to the highly nonlinear temperature response provided by thermistors, as taught by U.S. Pat. No. 4,391,137.

The apparatus and method of this invention employs a groundwater monitoring probe comprising a central electric heater and three or more temperature sensors surrounding the heater, which are immersed in the groundwater in a slotted, perforated, or screened section of a casing inserted in a monitoring well, and which are electrically connected to electronic measuring, computing, and recording means at the surface. When electric power is fed to the electric heater, there is a rise in water temperature in the groundwater surrounding the electrical heater. This temperature rise is sensed by the temperature sensors surrounding the heater. The temperature rise is greater in the direction of the groundwater flow and smaller in the direction opposed to the groundwater flow.

Comparison of the temperature responses at the different temperature sensors allows determination of groundwater velocity and direction, as more fully described below.

Resistance temperature detectors, thermocouples or any other temperature sensor may be used for sensing temperature differences, but resistance thermometers, because of their accuracy and repeatability, are preferred. Individually calibrated sensors may be used to measure absolute temperatures and temperature differences may be calculated therefrom.

III. BRIEF DESCRIPTION OF THE DRAWINGS

Figure 2:
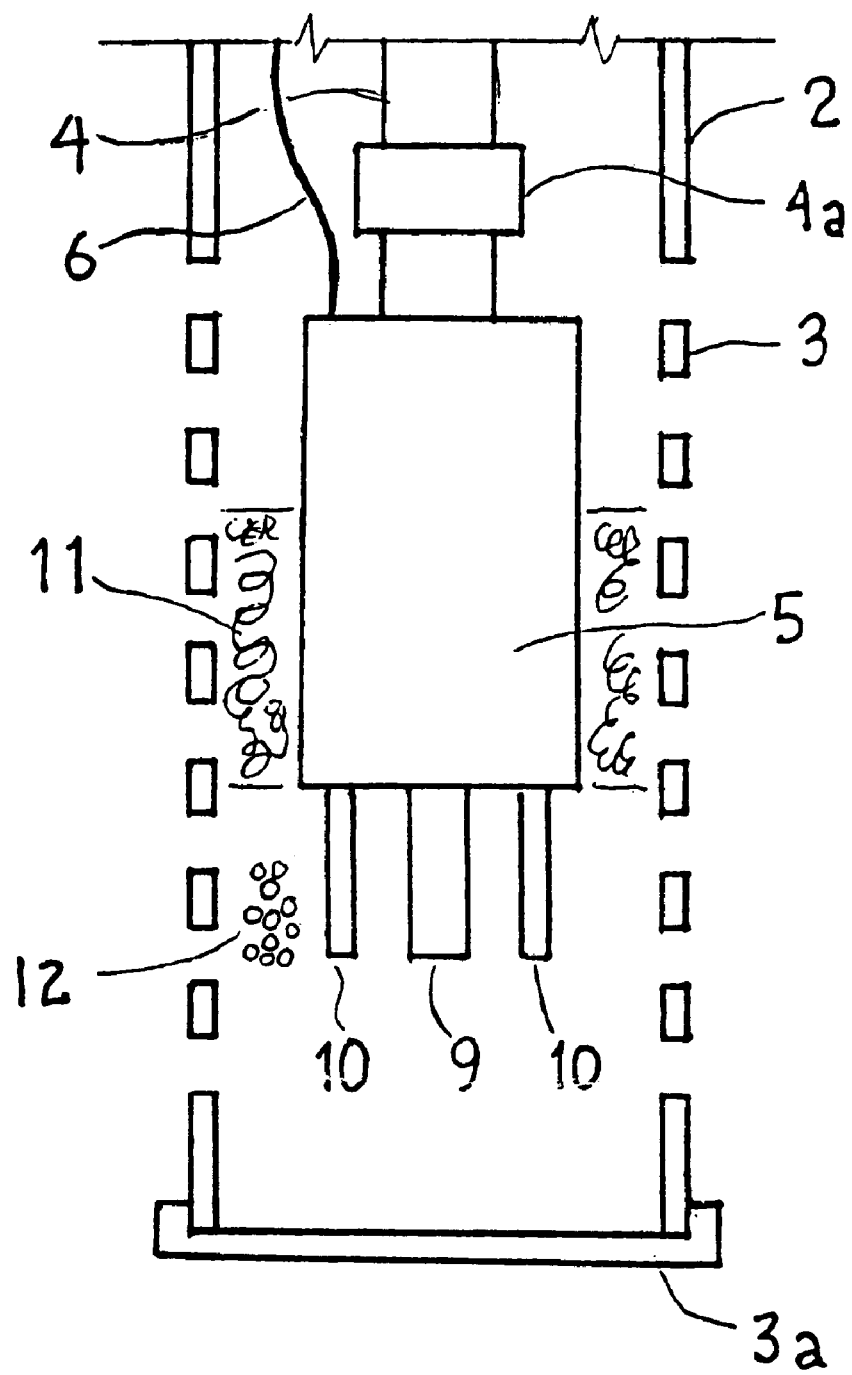
Figure 3A:
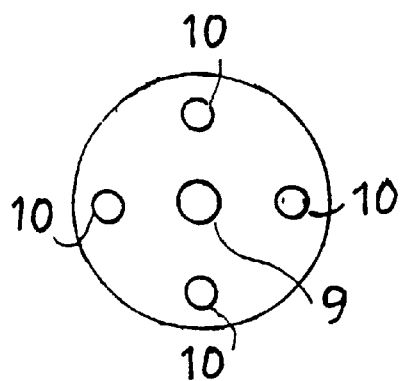
Figure 3B:
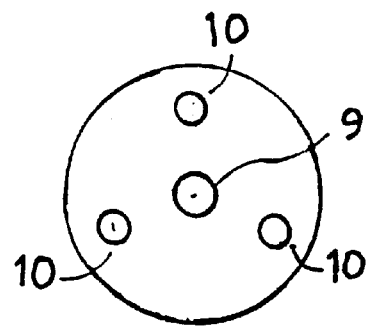
Figure 3C:
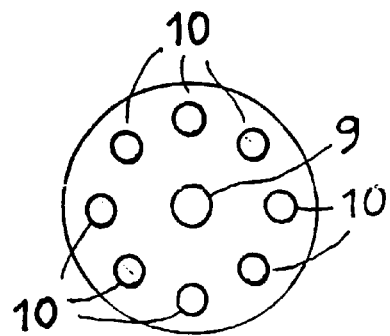

FIG. 1 is an overall schematic diagram of the system for measuring groundwater flow. FIG. 2 is an elevational cross section of the groundwater monitoring probe of this invention. FIGS. 3a, 3b, and 3c show end views of alternative embodiments of the groundwater monitoring probe.

IV. DETAILED DESCRIPTION OF PREFERRED EMBODIMENTS OF THE INVENTION

With reference to FIG. 1, there is provided a vertical cylindrical well shaft or borehole 1 into which is inserted a well casing 2 whose outer surface snugly fits into the well;

for clarity, FIG. 1 does not show the closeness of the fit of the well casing in the well borehole. At the bottom of the casing 2, there is provided a slotted, perforated or screened section 3 which is immersed in the groundwater at the level of interest and which allows horizontal groundwater flow through the region within the casing in which monitoring probe including a heater and a plurality of temperature sensors are positioned. The casing is capped at its lower extremity by a cap 3a. A suspension system comprising hollow tubes 4, having affixed to its lower extremity a monitoring probe 5, is inserted into the casing 2 such that the monitoring probe 5 is immersed in the groundwater 8 at the level of interest for groundwater flow measurement. Electrical wiring interconnects the components of the probe 5, illustrated in FIG. 2, and a data logger 7 at the surface. The electrical wiring 6 passes out of the probe through the well to the surface alongside the suspension system 4.

As illustrated in FIG. 2, the probe suspension system 4 may be assembled from tube sections connected end-to-end by precision-alignment couplings 4a. The probe 5 is centered within the casing by packing material 11 in the annular space between the probe and the inside surface of the casing. An electric heater 9 and no less than three temperature sensors 10 are provided at the lower end of probe 5. The heater is concentric with the probe, and the temperature sensors 10 are arranged equidistantly from the heater 9 in a circle with uniform spacing around the periphery of the circle. Four temperature sensors may thus be provided 90 degrees apart, as seen in FIG. 3a; or three sensors 120 degrees apart, as seen in FIG. 3b; or eight sensors 45 degrees apart, as shown in FIG. 3c. The space surrounding the heater 9 and the temperature sensors 10 is filled with glass beads 12.

The heater 9 and the temperature sensors 10 are electrically connected by wires passing through casing to the data logger 7 at the surface, as shown in FIG. 1. The data logger controls the energy to the electric heater 9 and measures and records the temperature response at the temperature sensors at a preselected time.

In operation, electric energy is supplied to the heater either as a short-duration pulse, or as a long-duration heating period which is terminated at a preselected time. The short-duration pulse typically lasts about 25 seconds, and the power level typically is about 14 watts. Data collection begins about 2.75 minutes after the heater is turned off. In this mode, the cycle may be repeated at one-hour intervals. This mode of operation is best suited to groundwater flow velocities greater than about 5 ft/day.

The long-duration heating mode is better suited to extremely low groundwater flow velocities. The heater is turned on for about 60 minutes at a power level of about 0.5 watts. Data are collected about one minute before termination of the heating cycle. This cycle is repeated typically at four-hour intervals. The temperature differentials sensed by the temperature sensors are of the order of 0.1 to 0.5° C. The spacing between the heater and the temperature sensors typically is 5–8 mm, preferably about 6 mm.

Platinum resistance temperature detectors are preferred as temperature sensors because of their accuracy, stability and linearity of response. The preferred temperature sensors are manufactured by R.D.F. Corporation of Hudson, N.H. Their model #218T-99-L4-A-6 has a nominal resistance of 1000 ohms at 0° C. and a rate of resistance change with temperature of 3.850 ohms/° C. A constant current of 2 milliamperes is provided to generate a variable voltage output in response to temperature changes.

Instead of platinum resistance thermometers, thermocouples may be used, although they are less accurate than resistance thermometers.

The data logger 7 may be a Campbell Scientific Data Logger model CR10-XT. The voltage outputs from the temperature probe are fed through a Campbell Scientific Model AM416 Multiplexer to the data logger, where the data are digitized and processed. The data logger is programmed for data collection, control of external circuits, and data processing to include the vector analysis of the data. The raw and processed data, both in digital format, are stored in a memory module for later down-loading to a computer spread sheet.

For remote installationselectrical power may be provided by a 12 volr battery charged by photovoltaic cells.

The determination of groundwater flow velocity and direction from temperature difference responses is most readily explained in terms of the four-sensor configuration illustrated in FIG. 3a. The temperature difference, north to south, is related to the north-south component of the flow velocity vector, y. The temperature difference, east to west, is related to the east-west component of the flow velocity vector, x. The relationship between temperature difference and velocity component is determined by calibration under laboratory conditions. Then the direction of the flow velocity is given by the angle $$alpha = \arctan y/x,$$

where alpha=0 in an easterly direction, alpha=90° in an northerly direction, etc.

The absolute magnitude of the groundwater flow velocity is given by $$V = \{[(\Sigma x)^2 + (\Sigma y)^2]^{1/2}\} * \text{calibration coefficient \{flow rate, ft/day/output unit\}},$$

where x=output units in the x-direction, and y=output units in the y-direction. Corresponding relationships between groundwater velocity components and the response to temperature differences may be provided for the temperature sensor configurations illustrated in FIGS. 3b and 3c.

While the above description constitutes the preferred embodiment of the invention, it will be appreciated that the invention is susceptible to modification, variation, and change without departing from the proper scope of fair meaning of the accompanying claims.

What we claim is:

1. Apparatus for measuring and recording groundwater flow velocity and direction comprising a probe concentrically disposed in a screened section of a well casing inserted in a groundwater monitoring borehole;

an electric heater concentrically affixed to the probe;

a plurality of temperature sensors arranged equidistantly around the heater and spaced uniformly around the periphery of a circle around the heater; and a data logger located at the surface and electrically interconnected by wiring to the electric heater and the temperature sensors, for controlling energy input to the heater and for measuring and recording the temperature response of the temperature sensors, and for computing the groundwater flow velocity and direction from the temperature responses at the temperature sensors.

2. The apparatus of claim 1 wherein the temperature sensors are resistance temperature detectors.

3. The apparatus of claim 1 wherein the temperature sensors are thermocouples.

4. The apparatus of claim 1 wherein four temperature sensors are arranged equidistantly around the heater 90 degrees apart.

5. The apparatus of claim 1 wherein three temperature sensors are arranged equidistantly around the heater 120 degrees apart.

6. The apparatus of claim 1 wherein the probe, including the heater and temperature sensors, are susended in the casing by a plurality of tube sections connected end-to-end by couplings.

* * * * *